US008301742B2

(12) United States Patent
Hanson et al.

(10) Patent No.: US 8,301,742 B2
(45) Date of Patent: Oct. 30, 2012

(54) SYSTEMS AND METHODS FOR COORDINATED MANAGEMENT OF POWER USAGE AND RUNTIME PERFORMANCE IN PERFORMANCE-MANAGED COMPUTING ENVIRONMENTS

(75) Inventors: James E. Hanson, Yorktown Heights, NY (US); Jeffrey Owen Kephart, Cortlandt Manor, NY (US); Malgorzata Steinder, Leonia, NJ (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 12/098,810

(22) Filed: Apr. 7, 2008

(65) Prior Publication Data

US 2009/0254660 A1  Oct. 8, 2009

(51) Int. Cl.
*G06F 15/173* (2006.01)

(52) U.S. Cl. ........................................ 709/223; 709/226

(58) Field of Classification Search .................. 709/223, 709/226
See application file for complete search history.

(56) References Cited

U.S. PATENT DOCUMENTS

| 5,651,006 | A * | 7/1997 | Fujino et al. ................... 370/408 |
| 6,938,184 | B2 * | 8/2005 | Totolos, Jr. ...................... 714/14 |
| 7,174,467 | B1 | 2/2007 | Helms et al. |
| 7,174,471 | B2 | 2/2007 | Komarla et al. |
| 7,219,241 | B2 | 5/2007 | Cooper et al. |
| 7,228,441 | B2 | 6/2007 | Fung |
| 7,688,746 | B2 * | 3/2010 | Hammarlund et al. ....... 370/252 |
| 2003/0055969 | A1 | 3/2003 | Begun et al. |
| 2004/0260489 | A1 * | 12/2004 | Mansingh et al. ............... 702/60 |
| 2005/0076253 | A1 * | 4/2005 | Lu ................................. 713/320 |
| 2008/0301473 | A1 * | 12/2008 | Perez et al. .................... 713/300 |
| 2009/0248976 | A1 * | 10/2009 | Rotithor ........................ 711/113 |

OTHER PUBLICATIONS

Autonomic Power & Performance for Large-Scale Data Centers, Bithika Khargharia, C IEEE, 2007.*
Mejia-Alvarez, P., et al. "Adaptive Scheduling Server for Power-Aware Real-Time Tasks". ACM Transactions on Embedded Computing Systems, vol. 3, No. 2. May 2004. pp. 284-306.
Chen, Y., et al. "Managing Server Energy and Operational Costs in Hosting Centers". SIGMETRICS '05. Jun. 6-10, 2005. pp. 303-314.
Khargharia, B., et al."Autonomic Power & Performance Management for Large-Scale Data Centers". AN-9516799. 2007. pp. 1-8.

* cited by examiner

*Primary Examiner* — David Lazaro
*Assistant Examiner* — Marie Georges Henry
(74) *Attorney, Agent, or Firm* — Tutunjian & Bitetto, P.C.; Preston J. Young

(57) ABSTRACT

Systems and methods are provided for dynamically controlling application placement and server resource allocation in a distributed system wherein a performance manager and power manager collaborate during run-time execution of data processing tasks to coordinate management and control of workload placement and server usage and dynamically determine a tradeoff between performance level and power usage that meets power and performance objectives.

20 Claims, 3 Drawing Sheets

US 8,301,742 B2

SYSTEMS AND METHODS FOR COORDINATED MANAGEMENT OF POWER USAGE AND RUNTIME PERFORMANCE IN PERFORMANCE-MANAGED COMPUTING ENVIRONMENTS

TECHNICAL FIELD

The present invention is generally directed to systems and methods for implementing coordinated management of performance and power usage of computing nodes in a distributed computing system and, in particular, systems and methods for dynamically controlling application placement and server resource allocation in a distributed system so as to balance a tradeoff between power usage and system performance while meeting combined power and performance objectives in a computing system.

BACKGROUND

In a distributed computing system or load sharing data processing system (e.g., datacenter), computing tasks are typically distributed for execution between one or more of a plurality of interconnected computing nodes (e.g., a cluster of server machines) that make up the distributed computing system. In such systems, performance management techniques are employed to dynamically optimize resource allocation and application placement among the cluster of computing server nodes. Performance management provides the capability of consolidating workloads onto a minimal number of physical servers in the server cluster, thereby reducing the total number of physical servers performing work at any one time. When the total workload increases, additional servers are allocated to provide resources needed for handling the increased workload.

With the continued growth of computing power and reduction in physical size of enterprise servers, the need for actively managing electrical power usage in large datacenters is becoming ever more pressing. In performance-managed systems, a significant savings in electrical power can be achieved by dynamically consolidating workload onto a minimum number of servers needed at a given time and powering off the remainder of unused servers. However, power management schemes that operate in this manner fail to consider the complexities of practical usage scenarios. For example, it is known that powering-on a server places stress on the hardware and servers that undergo more power-cycles tend to fail sooner than servers that undergo fewer power-cycles. Moreover, although the complete power down of unused servers may save power usage, such savings in power may be at the expense of performance in systems where response time is critical. Indeed, there can be an undesirable delay in response time due to latency of the reboot time that occurs when a server is subsequently powered-on for use during periods of increased workload.

SUMMARY

Exemplary embodiments of the invention include systems and methods for dynamically controlling application placement and server resource allocation in a distributed system to balance a tradeoff between power usage and system performance while meeting combined power and performance objectives in a computing system.

In one exemplary embodiment of the invention, a distributed computing system includes plurality of computing nodes interconnected in a network. The computing nodes include a plurality of servers forming a server cluster that provides a shared pool of server resources for executing data processing tasks, and an automated resource management system to manage the plurality of servers. The automated resource management system includes a performance manager that controls allocation of server resources and placement of workload on a set of servers in the server cluster according to performance constraints, and a power manager that controls power states and usage of servers in the server cluster according to power consumption constraints. The performance manager and power manager collaborate during run-time execution of data processing tasks to coordinate management and control of workload placement and server usage and dynamically determine a tradeoff between performance level and power usage that meets power and performance objectives.

In another exemplary embodiment of the invention, a method is provided for managing computing resources in a distributed system including a plurality of server nodes forming a server cluster that provides a shared pool of server resources for executing data processing tasks. The method includes allocating server resources for placing applications over a set of server nodes in the server cluster to perform data processing tasks; determining if a more optimal application placement can be made to achieve a more optimal balance between performance level and power usage and meet power and performance objectives for a current workload; and dynamically adjusting resource allocation to obtain a more optimal application placement.

These and other embodiments, aspects, features and advantages of the present invention will be described or become apparent from the following detailed description of preferred embodiments, which is to be read in connection with the accompanying drawings.

DETAILED DESCRIPTION OF EXEMPLARY EMBODIMENTS

Exemplary systems and methods for implementing coordinated management of power usage and runtime performance in a computing system will now be discussed in further detail with reference to the exemplary embodiments of FIGS. 1, 2 and 3, for example. It is to be understood that systems and methods described herein may be implemented in various forms of hardware, software, firmware, special purpose processors, or a combination thereof. In one exemplary embodiment, systems and methods described herein are software applications that are implemented in software with program instructions that are tangibly embodied on one or more program storage devices (e.g., hard disk, magnetic floppy disk, RAM, CD ROM, DVD, ROM and flash memory), and executable by any computing system, device or machine comprising suitable architecture. It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
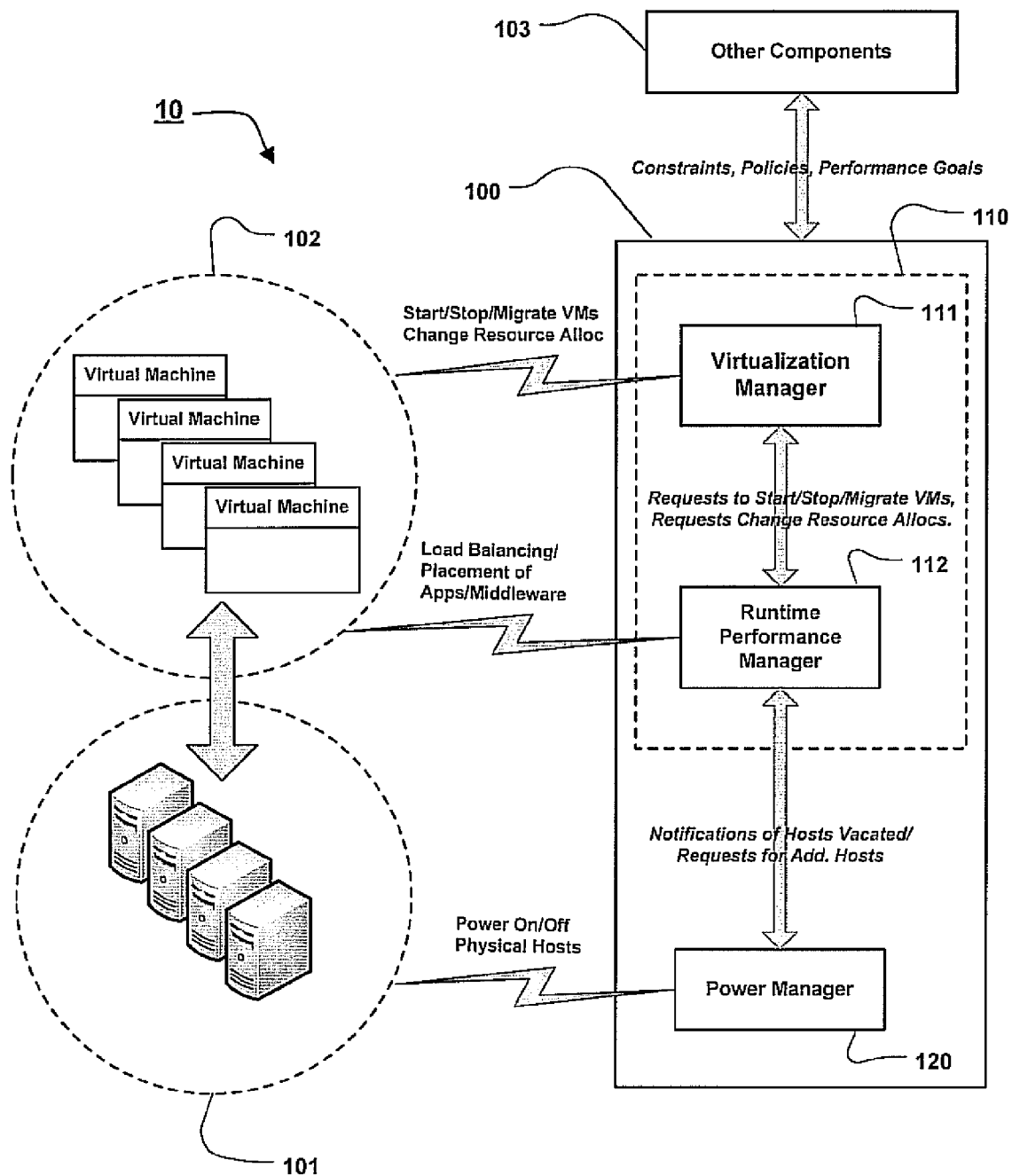
FIG. 1 illustrates a distributed computing system having an automated resource allocation system that provides coordinated management of power usage and runtime performance, according to an exemplary embodiment of the invention.

FIG. 1 illustrates a distributed computing system having an automated resource allocation system that provides coordinated management of power usage and runtime performance, according to an exemplary embodiment of the invention. In particular, FIG. 1 schematically illustrates a distributed computing system (10) (e.g., datacenter) comprising an automated resource management system (100) that manages and controls a shared pool of system resources including a plurality of computing nodes (101) (e.g., server nodes forming a server cluster) and virtual machines (102) that execute on one or more computing nodes (101). The resource management system (100) is a software platform with constituent system components, modules that may reside and execute on one or more computing modes interconnected to the server nodes in a network (e.g., LAN, WAN, etc.). The resource management system (100) generally comprises a performance manager (110) (or placement controller) and a power manager (120). The performance manager (110) controls allocation of server resources and placement of workload on a set of server nodes in the server cluster according to performance constraints and the power manager (120) controls power states and usage of server nodes in the server cluster according to power consumption constraints. As explained below, the performance manager (110) and power manager (120) collaborate during run-time execution of data processing tasks to coordinate management and control of workload placement and server usage and dynamically determine a tradeoff between performance level and power usage that meets power and performance objectives.

In one exemplary embodiment as depicted in FIG. 1, the performance manager (110) comprises a virtualization manager module (111) and a run-time performance manager module (112). The run-time performance manager module (112) implements methods for automatically controlling placement of applications and/or middleware on a set of server nodes (under its control) or otherwise balancing workload over a set of server nodes in the cluster of servers (101) under the control of the performance manager (110). The performance manager (110) determines an optimal placement using constrained optimization control methods in order to meet combined performance, security, availability, and administrator-specified goals, as provided by other components (103) in the system (10). For example, the run-time performance manager module (112) may issue control signals to start, stop or consolidate application instances or processes executing on one or more physical servers, balance workload among a set of servers, etc. In virtualized environments, the virtualization manager module (111) operates on virtual machines (102), adjusting the amount of server resources allocated to the virtual machines and moving the virtual machines between server nodes within server cluster (101). The virtual manager module (111) may implement methods to consolidate multiple operating systems and applications in order to increase utilization and reduce sprawl.

In general, during runtime operation of the distributed system (10) as data processing tasks are being performed by one or more server computing nodes, the performance manager (110) can evaluate a current workload and processing capacity of the system at a given time to determine if performance goals are being met. The "workload" generally refers to the total amount of I/O utilization, processor utilization, and/or (3) any other performance metric of currently operating servers allocated to process data processing tasks. The term "throughput" refers to the amount of workload performed in a certain amount of time. The term "processing capacity" denotes a maximum level of throughput under a current server configuration. The performance manager (110) determines an optimal or improved workload placement or resource allocation in order to meet combined performance, security, availability, and administrator-specified goals, as provided by other components (103) in the system (10). The performance manager (110) can add resources, move applications and redirect workloads, and can provision new servers during runtime operation to meet performance goals and objectives, but with some power consumption constraints applied under control of the power manager (120).

The power manager (120) controls power states and usage of server nodes in the server cluster according to power consumption constraints with the goal of reducing power usage. In one exemplary embodiment of the invention, the power control objectives are secondary to providing a sufficient level of performance. In this regard, the performance manager (110) and power manager (120) collaborate during run-time execution of data processing tasks to coordinate management and control of workload placement and server usage and dynamically determine a tradeoff between performance level and power usage that meets power and performance objectives.

The ability to coordinate power and performance management is not trivial. Good performance management requires deep knowledge of application properties and requirements, administrator policies, constraints, and hosting and containment hierarchies, etc, whereas power management operates on different set of factors such as server efficiency; lifecycle wear-and-tear, power budgets, etc. In accordance with an exemplary embodiment of the invention, the power manager (120) is a controller that is designed based on a locus of power-management expertise independent of performance-management expertise on which the performance manager (110) is designed, but the power manager (120) operates to collaborate in a specific way with performance manager (110) to achieve best overall behavior. For example, in one exemplary embodiment of the invention, control models are designed according to a set of control parameters/constraints using constrained optimization control methods for modeling a tradeoff of run-time performance against power consumption, such that a degree to which performance may be traded off against power usage at a given point during runtime may be dynamically determined so as to dynamically achieve an optimal tradeoff between application placement and server usage, for example.

The power manager (120) operates in conjunction with the performance manager system (110) to control server usage and power states of server nodes in the server cluster (101). The power manager (120) will control a number of servers allocated for use at a given time. At any given time, the performance manager (110) can utilize a subset of servers for which control has been granted by the power management system (120). If the performance manager (110) determines that additional servers are needed to meet performance objectives under current workloads, the performance manager (110) will send a request message to the power manager (120) for control over one or more additional servers. The performance manager (110) can use cost functions supplied by power manager (120) to male such decisions for additional servers. The power manager (120) can grant or deny any request. The performance manager (110) can release control over a server at a given time when consolidating workloads on a smaller subset of running servers.

At a given time, the power manager (120) will have control of none, one or more servers in a pool of servers, for which control has not been granted to the performance manager (110). For those servers under control of the power manager (120), the power manager can manage the power states of the servers to meet power consumption constraints, and assign the servers to other entities, at its discretion. The power manager may maintain a server in one of various types of power states including (i) a "powered-on" state (where the server is fully powered on and running) (ii) a "powered-off" state (where a server is completely powered off and requires a full reboot of the hardware and operating system). (iii) a "reduced power" state (where a server operates at some lower power mode) There may be several different "reduced power" states including a "sleep state," in which at least some data processing system components (e.g., memory, and buses) are powered down, but can be brought to full power without rebooting, or an "idle state," with a frequency throttled processor, but an active memory. The idle state allows a rapid return to a full powered-on state.

Figure 2:
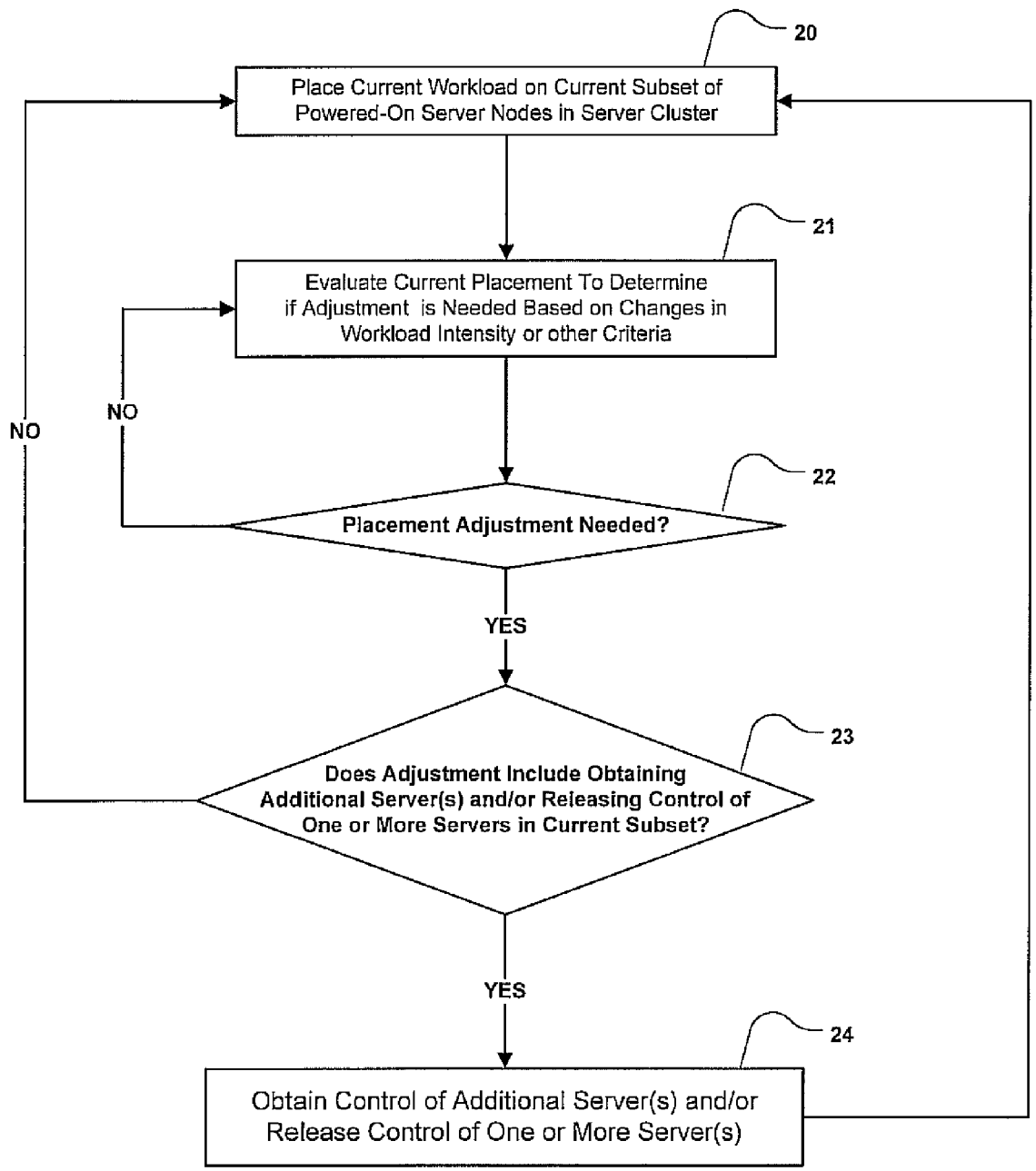
FIG. 2 is a flow diagram that illustrates a method for implementing automated performance management in conjunction with a power manager according to an exemplary embodiment of the invention.

FIG. 2 is a flow diagram that illustrates a method for implementing automated performance management according to an exemplary embodiment of the invention. FIG. 2 illustrates a mode of operation of the performance manager (110) in FIG. 1, according to an exemplary embodiment of the invention. In FIG. 2, it is assumed that the performance manager (110) has control over a given subset of powered-on server nodes of the server cluster (101) at some point in time during ran-time operation of the computing system, where the performance manager (110) places or otherwise redistributes a current workload on the subset of powered-on nodes under its control (step 20). During runtime operation, the system resource manager system (100) will monitor or otherwise receive various performance data related to, e.g., processor utilization, I/O utilization, server usage, and/or other performance metrics, which data is used by both the performance manager (110) and power manager (120) to support management functions.

The performance manager (110) will evaluate the current placement (either periodically and/or upon some triggering event) to determine if an adjustment is needed in view of changes in workload intensity or other criteria (step 21). For example, in one exemplary embodiment of the invention, an evaluation process involves the performance manager (110) evaluating the operating conditions and workload to determine one or more possible new application placements that would meet performance objectives in view of the current workload and operating conditions. This determination can be based on evaluating various possible changes to the current subset of servers operating under the control of the performance manager (110) in view of current workload and operating constraints. For example, if the performance is degraded because the current workload exceeds the processing capacity of the set of servers under the control of the performance manager (110), one or more additional servers may be needed to achieve an optimal placement or improved placement, whereas if the processing capacity exceeds the current workload, one or more servers may be vacated with the workload consolidated on remaining servers.

The evaluation process (step 21) by the performance manager (110) can be based, in part, on information provided by the power manager (120) with regard to recommendations for releasing and/or obtaining servers under current operating conditions and workloads. For example, when the workload changes in such a way that one or more of the running physical servers may be vacated without compromising the performance objectives of the performance manager (110), the power manager (120) may provide a set of recommendations for which servers node in the current subset of running servers are most desirable to be released (vacated). The performance manager (110) can then choose, from among those recommendations, one or more servers to release control of to the, while meeting its performance goals. The power manager (120) may then power-off the vacated server(s). Similarly, when the workload changes in such a way that workload exceeds the total processing capacity of the current subset of running servers, and the performance objects of the performance manager (110) are not being met, the power manager (120) can provide a set recommendations for one or more additional servers to be given control to the performance manager (110) and added to the current subset of running servers, to thereby handle the increased workload. The performance manager (110) can select recommended servers and query the power manager (120) for selected server(s).

The decision to select a new subset of serves can be decided based on an optimization function or utility cost function to determine whether a new subset of servers would improve or optimize a tradeoff between power usage and system performance while meeting operational constraints and/or SLA goals, while allowing application performance to be somewhat degraded as a balance to meeting power consumption objectives. In one exemplary embodiment of the invention where performance is measured relative to a service level agreement (SLA), service provider should be able to decide whether to always meet the SLAs based on their value, penalties, and the cost of running the datacenter (of which electrical power usage is an important component). Therefore, a cost function is use that models a tradeoff between power and performance and designing a controller that optimizes application placement and server usage so as to achieve an optimal tradeoff.

Based on the evaluation results, the performance manager determines whether a placement adjustment is needed (step 22). This determination may be performed by, e.g., comparing a newly determined placement/resource allocation against the current placement. If the current placement is the same or similar to the newly determined placement (negative determination in step 22), then no adjustment is needed, and the process continues back to step 21. On the other hand, if it is determined (in step 22) that placement adjustment is needed, the performance manager determines whether the adjustment involves obtaining control of one or more additional servers and/or releasing control of one or more servers (step 23). In the process flow of FIG. 2, the performance manager can decide to (1) keep the subset of currently running servers the same and simply change placement among the subset of servers (2) vacate one or more servers and release to power manager or (3) query power manager for control of new servers.

If the adjustment does not involve obtaining control of new servers and/or releasing control over existing servers (negative determination in step 23), then process flow continues where the performance manager (110) redistributes the current workload over the same set of servers under the control of the performance manager to achieve the optimal or improved placement (step 20). On the other hand, if the placement adjustment involves changes to the current subset of servers (affirmative determination in step 23), the performance manager (110) will send a request to the power manager (120) to obtain control of additional servers(s) and/or send a notification to the power manager (120) to release control of one or more servers to the power manager (step 24). Thereafter, process flow continues (in step 20) where the performance manager (110) places the current workload on the new subset of powered-on servers under control of the performance manager (110).

Figure 3:
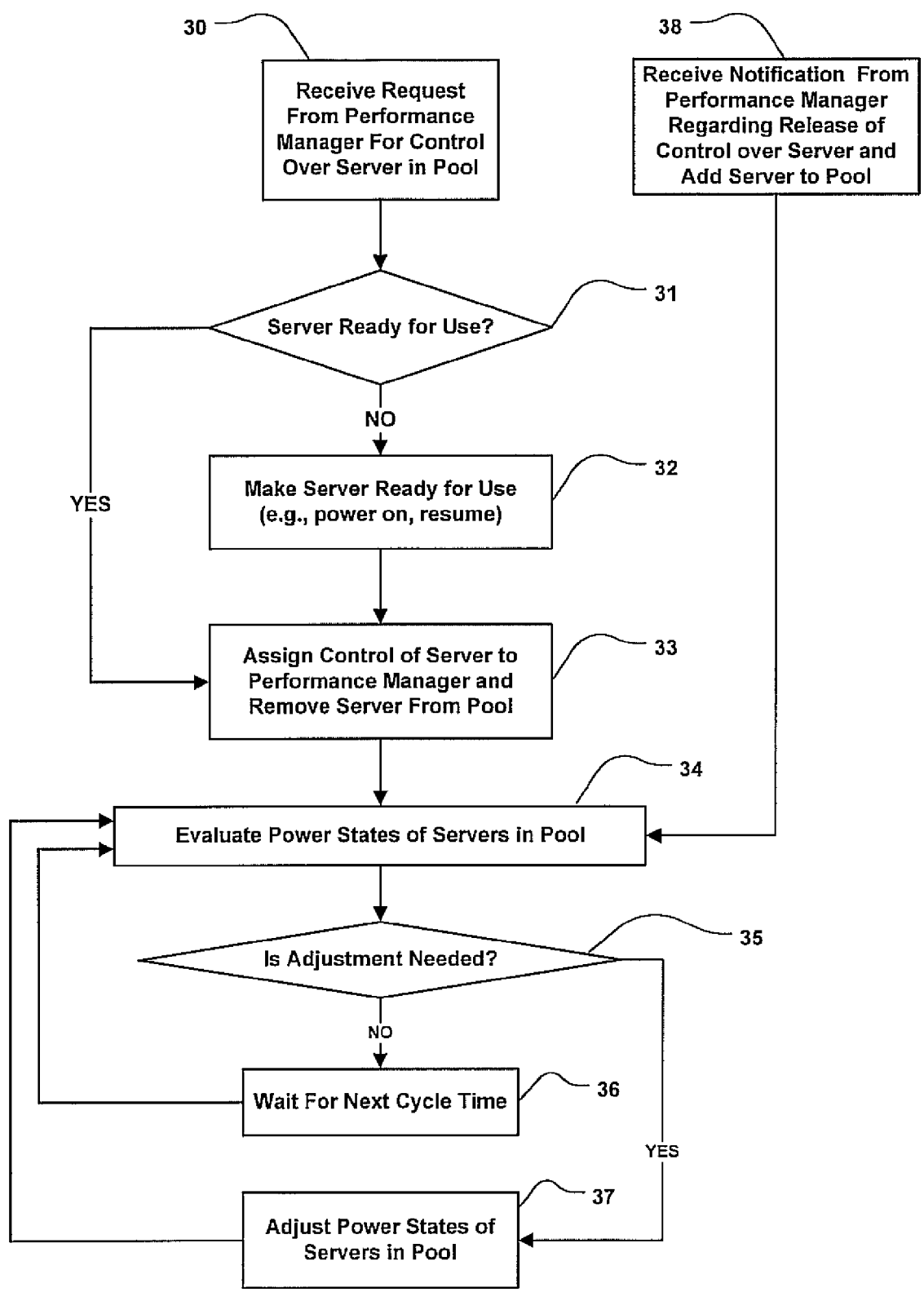
FIG. 3 is a flow diagram that illustrates a method for implementing automated power management in conjunction with a performance manager according to an exemplary embodiment of the invention.

FIG. 3 is a flow diagram that illustrates a method for implementing automated power management according to an exemplary embodiment of the invention. FIG. 3 illustrates a mode of operation of the power manager (120) in FIG. 1, according to an exemplary embodiment of the invention. As discussed above, the performance manager (110) can either send notification messages to the power manager (120) when control of a server has been released (vacated) to the pool of servers under the control of the power manager (120) or send request messages to the power manager to obtain control of servers within the pool of available servers under control of the power manager (120).

Referring to FIG. 3, when the power manager (120) receives a request for control of a server (step 30), the power manager will determine if a server is ready for allocation (step 31). For example, the power manager (120) will determine if a server is actually available and in a powered-on state. If a server is ready for use (affirmative determination in step 31), the power manager (120) will grant the request and assign control of a server to the performance manager and then remove the server from the pool of servers under the control of the power manager (120) (step 33). If a server is not yet ready for use (negative determination in step 31), the power manager will proceed to make the server ready for use (step 32). For example, if the server is in a powered-off state or reduced power state, the power manager (120) will send control signals to power-on the server from the powered-off state, resume from an idle, or sleep state.

Thereafter, the power manager will proceed with an autonomous process of power state management (steps 34, 35, 36 and 37) for the remaining servers in the pool of servers under the control of the power manager (120). Similarly, when the power manager (120) receives notification from the performance manager (110) that control of a server has been released (step 38), the server is placed in the pool of available servers under control of the power manager (120) and the power management process continues with steps 34-37, which proceeds as follows.

After assigning control of a server or regaining control of a server, the power manager will evaluate the power states of servers in the pool (step 34) and determine if the power state of one or more servers should be adjusted (step 35). During run-time operation, the power manager (120) can control the power states of servers in the pool based on current or anticipated workload conditions in environment of the distributed system and power consumption constraints. For example, the power manager (120) can place one, more, or all servers in the pool of servers in a powered-off state to minimize power usage. Despite the latency required to perform a full reboot of a server, maintaining a server in a powered-off sates may be suitable where increased response time (due to full reboot required) is not critical or is otherwise acceptable tradeoff in view of the increased power savings. On the other hand, if response time is critical or relatively important to meet performance objectives during operation of the distributed system, a shutdown of unneeded servers and the subsequent required reboot time might be undesirable. In this case, the selected reduced power state might be an idle or sleep state to minimize latency for powering up and needed server. Indeed, in both cases, the reduced power servers may be quickly powered up when being assigned control to the performance manager to meet increased workloads.

Referring back to FIG. 3, if an adjustment is needed (step 35), the power manager will adjust the power states of one or more servers in the pool as desired (37). If no adjustment is needed (step 35), the power manager waits for a next cycle time (step 36) and then proceeds to evaluate the power states of servers in the pool under the current workload and operating conditions and power consumption constraints (step 34). It is to be understood that the process flow (of steps 34-37) is repeated periodically irrespective of whether control of servers in the pool are assigned or obtained from the performance manager in response to requests and notifications (steps 30 and 38).

An exemplary system description and system model according to one exemplary embodiment of the invention will now be described in detail, which sets forth an exemplary detailed implementation of the various systems and methods discussed above in connection with FIGS. 1, 2 and 3. In the following discussion, an application placement controller (APC) is extended to include power management functions, where the APC consolidates workload to achieve a desired level of power savings while meeting specified performance objectives. A controller model is described, which allows applications to be placed to meet combined power and performance objectives. One straightforward approach to addressing the tradeoff is to give blanket priority to performance by consolidating workload onto the minimum number of machines sufficient to serve it, and turning off the unused machines. However, much greater energy savings are possible if we allow application performance to be somewhat degraded. In the exemplary system described hereafter, an application's performance is measured relative to a service level agreement (SLA), which allows a reduction in the amount of computing resources allocated to the applications—thereby saving power at the expense of performance—to the point where the SLA goals are just barely being met. However, this approach is too inflexible. Even if service contracts specify SLAs of applications, the service provider should be able to decide whether to always meet the SLAs based on their value, penalties, and the cost of running the datacenter (of which electrical power usage is an important component). Therefore, exemplary embodiments of the invention consider modeling a tradeoff between power and performance and designing a controller that optimizes application placement and server usage so as to achieve an optimal tradeoff.

In the following exemplary system model, the degree to which performance may be traded off against power is itself adjustable using a small number of easily understood parameters, permitting administrators in different facilities to select the optimal tradeoff for their needs. For purposes of illustration, it is assumed that the system (10) of FIG. 1 is a data center with a cluster of server machines (101) that are provided to service requests to web applications, where each web application may be replicated for high-availability and performance to the multiple server machines (101). The set of all replicas of a given application (here called the instances of the application) constitutes an application cluster. Application clusters may arbitrarily overlap on physical machines (101).

In the exemplary system, it is further assumed that each application is accessed by a certain number of client sessions, which varies over time. Session requests may be deemed to arrive at a proxy router that provides flow-control, wherein a flow controller (or dispatcher) places incoming requests in queues and dispatches them from the queues to prevent overload on the backend server machines. The dispatching may be performed based on a weighted-fair round robin scheduling protocol. The dispatching weights are controlled based on application SLAs (service level agreements), which for illustrative purposes are deemed to be defined in terms of average response time goals. The flow controller monitors and profiles incoming request flows while estimating their average service time on each backend server, response time, number of client sessions, client drink times, and CPU work factor. Based on these data, the flow controller models application response time as a function of CPU speed allocation. The model is used to calculate an optimal division of server CPU capacity among applications, which translates into optimal dispatching weights for the dispatcher. The flow controller is limited by the current placement of application instances, which introduces constraints on the amount of CPU capacity that may be used by each application.

The placement of applications is controlled by a placement controller, which control placement of a given application by starting and stopping individual instances of the application. The placement controller may dynamically change application placement based on workload intensity and application SLAs. The placement controller may periodically evaluate the placement of applications and modifies the placement to better optimize the allocation of resources. To achieve this goal, the placement controller may collaborate with the flow controller, wherein the flow controller provides the placement controller with application performance information. The placement controller may place applications according to the same optimality criteria as those used by the flow controller.

Alien placing application instances, the placement controller strives to meet CPU and memory capacity constraints as well as various other constraints such as allocation restrictions, collocation restrictions, affinity constraints, minimum and maximum number of instances for each application, etc. Although the flow and placement controllers operate jointly to solve the same optimization problem, the flow and placement controllers are separate entities working on different time scales. For example, the flow controller may readjust queue-dispatching weights every 15-30 seconds, which ensures rapid response to workload intensity changes. On the other hand, the placement controller may readjust application placement every several to tens of minutes, as placement changes are typically heavy-weight and time consuming.

In accordance with an exemplary embodiment of the invention, a placement controller as discussed above can be extended with functionality to consolidate application instances on a subset of available server machines so as to permit turning off the remaining machines. The following discussion provide an example embodiment of a system model for implementing a placement controller with extended functionality to provide coordinated power-performance management according to an exemplary embodiment of the invention.

To model the system, we start with a set of server machines (referred to as nodes) $\mathcal{N} = \{n_1, \ldots, n_N\}$. At any time, a node $n_i$ is either powered-on or powered-off. The set of nodes that are powered-on is denoted by $\mathcal{N}^{on}$. Bach node $n_i$ has CPU capacity $\Omega_n$ and memory capacity $\Gamma_n$. A set of applications is denoted $\mathcal{M} = \{m_1, \ldots m_M\}$. A placement matrix P describes the way instances are distributed across nodes. The term $P_{mn} = i$ denotes that application m has i instances running on node n. For illustrative purposes, we only consider the case $i \in \{0,1\}$. When $P_{mn} = 0$ for all m, then node n may be turned off to save power, i.e., it may be excluded from $\mathcal{N}^{on}$.

With a given placement P, each application instance is allocated a portion of the memory and CPU resources of the node on which it is running. The placement is assumed to obey a variety of constraints and policies that are unrelated to performance goals, which has no effect on the power vs. performance tradeoff with which we are concerned. We focus on the CPU allocation, where the amount of CPU resources allocated to the instance of application m running on node n is denoted by $\omega_{mn}$.

A CPU allocation matrix, denoted L, gives $\omega_{mn}$ for all m and n. We have $0 \leq \omega_{mn} \leq \Omega_n$ and $P_{mn} = 0$ implies $\omega_{mn} = 0$. It is also useful to form partial sums over nodes ($w_m^{app} = \Sigma_n \omega_{mn}$) and over applications ($\omega_n^{node} = \Sigma_m \omega_{mn}$). To place application instances, both P and L should be computed, but from the perspective of the placement controller they are tightly linked. Henceforth, we will use L to describe application placement, as the CPU allocation has a more direct influence on power consumption.

Next, the electrical power usage $\pi$ of a running node can be modeled as a linear function:

$$\pi_n(\omega_n) = p_{0,n} + p_{1,n} \omega_n^{node} \qquad (1)$$

where $p_{0,n}$ denotes an idle-power term, which is electrical power used by node n if it is powered on but idle. It is to be understood that power usage can be modeled using other forms of nonlinear functions. The total electrical power usage as a function of CPU allocation may be expressed as:

$$\Pi(L) = \sum_{n \in \mathcal{N}^{ON}} \lfloor p_{0,n} + p_{1,n} \omega_n^{node} \rfloor \qquad (2)$$

In practice the idle-power terms dominate the CPU-dependent terms by a factor of 3-5 or more, even when a node is running at capacity (so $\omega_{mn} = \Omega_n$).

Next, an application performance vector in terms of response time may be express as $$d_m = \frac{\tau_m - RT_m}{\tau_m},$$

where $\tau_m$ represents a response time goal that is defined in an SLA for application m, and where $RT_m$, is the measured response time. In this regard, the performance for an application is 0 when the SLA is just being met, and 1 when the response time is perfect, i.e. equal to 0. We assume, in this example, that performance is based upon response time, but in general, it can be any performance metric, such as throughput.

To express the tradeoff between application performance and electrical power usage, we introduce a system utility function $U(d,\Pi)$ that depends on both a performance vector d (in which component $d_m$ represents the performance of application m) and the total power consumption $\Pi$. We assume that the utility can be separated into a performance value portion V(d) and an electrical power cost portion $C(\Pi)$, where a net utility is simply $U = V - C$. Since both the performance and the power consumption are determined by the CPU allocation matrix L, V, C and U are correspondingly functions of L.

In general, one can envision many different plausible functional forms for V(d) and $C(\Pi)$, which is a matter for the business or system administrators of the give application datacenter to decide. For illustrative purposes, we select specific functional forms that, from experience, are deemed practical. First, we assume that the electrical power cost is linear in the power consumption, and for simplicity set $C(\Pi) = \Pi$, where any constant of proportionality can be absorbed into the value function. Second, we take the value function V to depend on d. The total value function is defined as a sum over application-specific value functions: $V(d)=\Sigma_m v_m(d_m)$. Specific forms for the functions $v_m(d_m)$ will be discussed below.

In one exemplary embodiment, we can simply compute the CPU allocation L that optimizes $U(L)=V(d(L))-\Pi(L)$. However, a more subtle approach that constrains our search to a subset of the full universe of possible L may be taken. This approach is based on previous findings that making allocations according to a utility function that sums over individual application value functions unduly favors the applications that are deemed more "important", often starving applications with lower value to the point where their SLAs are violated dramatically. The resulting system behavior can be hard to predict and analyze. Moreover, system administrators tend to expect "fair" resource allocation, in which all applications are doing approximately equally well in meeting their SLA goals, i.e. the performance values $d_m$, are roughly the same. Fairness is achieved in the existing placement controller by choosing an allocation L* according to a max-min optimization over L, as follows:

$$L^* = \underset{L}{\operatorname{argmax}} \min_m d_m(L) \qquad (3)$$

In order to combine the fairness achieved by Eq. (3) with the power-performance tradeoff that would be achieved by optimizing over U(L), we separate the problem into two parts solved by two conceptually different entities operating on different timescales—a power controller that determines which nodes are to be turned on, and a placement controller that determines how the applications are to be placed on those nodes. The placement controller uses Eq. 3 to determine L* given a fixed set of nodes. As explained in further detail below, the power controller considers various possible settings of $N^{ON}$, querying the placement controller to determine what would be the resulting $L^*(N^{ON})$. The power controller then compares the net utility $U(L^*(N^{ON}))=V(d(L^*(N^{ON})))-\Pi(L^*(N^{ON}))$, and selects $N^{ON}*$ to maximize $U(L^*(N^{ON}))$. The resulting solution will in general yield a somewhat lower U than would have been attainable with no constraints on L, but would yields a good power-performance tradeoff that also satisfies the fairness criterion.

Next, we describe in further detail the application value functions $v_m(d_m)$ that compose the total value function V(d). In one exemplary embodiment, we select functions that promote the behavior that system administrators would desire and expect, and possess tunable parameters that provide flexible controls over their shape that reflect a range of power-performance tradeoffs in an understandable manner. Moreover, we select functions that permit us to select the desired level of application performance and to control the rate with which the function value changes as the distance between an achieved performance level and the desired performance level increases. This rate of change determines the relative importance of application performance and electrical power savings.

Based on these considerations, in one exemplary embodiment of the invention, the following functions may be applied:

$$v_m(d_m)=v_{m,1}+v_{m,0}(1-(1+d_{m,0}-d_m)^k) \qquad (4)$$

wherein the parameters of $v_m(d_m)$ can be interpreted as follows. The value of $d_{m,0}$ configures a desired level of application performance. For example, we use $d_{m,0}=0$ when it is sufficient to only meet SLA goals and $d_{m,0}=1$ when we want the system to offer the best possible performance and only consolidate unused cycles. The intermediate values between 0 and 1 allow continuous tuning between these extremes. We can also use it to implement a safety zone to prevent SLA violations as a result of the unavoidable inaccuracies of profiling and modeling techniques used by our system. Parameter k ("rigidity"), which is greater than or equal to 1, controls the importance of achieving $d_{m,0}$ relative to saving power. A low value of k permits the system to reduce physical machines usage in violation of $d_{m,0}$. A high value of k forbids such a tradeoff, as it makes value function essentially a step function. The value of $v_{m,1}$ controls the vertical offset of the value function and is presented here for cosmetic reasons. Since we are essentially concerned with finding the allocation that achieves the optimal tradeoff, and not with the absolute value of that tradeoff, $v_{m,1}$ may be set to 0 with no loss of generality.

Parameter $v_{m,0}$ controls the absolute value of the value function, which must be dependent on workload intensity. Parameter $v_{m,1}$ also controls the first derivative of $v_m$. To select the right $v_{m,0}$, we consider the relationship between value and power functions. The electrical power usage is a piece-wise linear function with discontinuities that occur when to increase CPU allocation a new server must be turned on. The height of the discontinuity corresponds to the power cost of the added server in idle state, $p_{0,n}$. In continuous regions, the power function increases linearly with rate $p_{1,n}$. The system utility, which is the distance between value and power curves is maximized at a point $\omega_0$ where the first derivative of the value function is equal to $p_{1,n}$, or at any value of CPU allocation where discontinuity occurs and which is less than $\omega_0$. When $d_m(\omega_0)<d_{m,0}$, the system will never achieve $d_{m,0}$ $d_m$, which is the performance level desired by a user. Hence, we choose a $v_{m,0}$ that allows $d_m(\omega_0)\geq d_{m,0}$. To achieve this objective, we use a $v_{m,0}$ with a minimum value defined as follows:

$$v_{m,0} = \frac{1}{k}\omega'_m(d_{m,0})\max_n p_{1,n} \qquad (5)$$

where $\omega'_m$ is the derivative of $\omega_m$ with respect to d taken at $d_{m,0}$.

We now describe an exemplary power management process according to an exemplary embodiment of the invention. In one exemplary embodiment, the power manager determines the subset of servers that must be powered on in order to maximize system utility, and interacts with a placement controller as described above. An optimal solution to the power-performance tradeoff problem involves evaluating all subsets of nodes by calculating an optimal application placement that uses a given subset of nodes and evaluating the utility of the resultant placement, using heuristics. For example, one approach is to search the space of machine subsets starting from the subset of machines that are currently turned on, wherein the search is performed in two directions—by adding and by removing machines from the set. We evaluate one choice of a machine to be added or removed, and then proceed to add or remove more machines. The process terminates when the change does not increase the utility.

In this exemplary embodiment, since we evaluate only one machine as a candidate to add or remove, various factors are considered when selecting candidate servers. For example, some considerations that may be taken into account take into account include (1) application affinity to servers; (2) application allocation restrictions; (3) machine power efficiency. In particular, with regard to factor (1), application affinity to servers, consideration is given to the fact that it may not be possible to remove some application instances from a server due to potential loss of state or the cost of migration to a different server. By way of example, a server cannot be removed, which hosts an application that cannot be replaced. Further, with regard to factor (2), application allocation restrictions, an application may be only runnable on a subset of server machines that match its requirements. Thus, when adding a node, a node should be selected that can run the lowest-performing application. When removing the node, we avoid selecting one that runs the lowest-performing application. Further, with regard to factor (3), machine power efficiency, it is preferable to add machines that are more power efficient, where power efficiency is defined as a ratio of machine power usage at maximum CPU utilization to its maximum CPU speed.

Considering that evaluating a subset involves solving the placement problem, it is reasonable to constrain the search space to subsets whose cardinality differs from the cardinality of the currently running subset by not more than a configured number of machines. Besides reducing the complexity, this conservative approach helps prevent oscillations. The overall complexity of the power management algorithm is therefore equivalent to the complexity of the placement algorithm, and for the exemplary process described above it is $O(NM^2)$.

Although illustrative embodiments have been described herein with reference to the accompanying drawings, it is to be understood that the invention is not limited to the precise system and method embodiments described herein, and that various other changes and modifications may be affected therein by one or ordinary skill in the art without departing from the scope or spirit of the invention. All such changes and modifications are intended to be included within the scope of the invention as defined by the appended claims.

What is claimed is:

1. A distributed computing system, comprising:
    a plurality of computing nodes interconnected in a network, wherein the computing nodes comprise a plurality of servers forming a server cluster that provides a shared pool of server resources for executing data processing tasks, and an automated resource management system to manage the plurality of servers;
    wherein the automated resource management system comprises:
    a performance manager that controls allocation of server resources and placement of workload on a set of servers in the server cluster according to performance constraints;
    a power manager that controls power states and usage of servers in the server cluster according to power consumption constraints,
    wherein the performance manager and power manager collaborate via a messaging scheme during run-time execution of data processing tasks to coordinate management, control and redistribution of workload placement among the servers and dynamically determine a tradeoff between performance level and power usage that meets power and performance objectives, the messaging scheme being configured for requesting and transferring control of the servers between the performance manager and the power manager to redistribute the workload placement among the servers to achieve the tradeoff.

2. The system of claim 1, wherein collaboration between the performance manager and power manager comprises the performance manager issuing a request for control of additional server resources, and the power manager either granting or denying the request.

3. The system of claim 1, wherein collaboration between the performance manager and power manager comprises the performance manager releasing control of server resources to the power manager.

4. The system of claim 1, wherein collaboration between the performance manager and power manager comprises the power manager recommending one or more additional servers for use by the performance manager which would result in a more desirable tradeoff between performance level and power usage for an increased workload.

5. The system of claim 1, wherein collaboration between the performance manager and power manager comprises the power manager recommending release of control of one or more servers by the performance manager, which would result in a more desirable tradeoff between performance level and power usage for a decreased workload.

6. The system of claim 1, wherein the power manager controls a power state of server nodes in a pool of unused server nodes to minimize power consumption, subject to power consumption constraints.

7. The system of claim 1, wherein power consumption constraints comprise a cost of powering on a server in view of a number of power cycles of the server.

8. The system of claim 1, wherein a tradeoff between performance and power consumption is determined using a utility function, which includes a performance function to compute a performance level and power usage function to compute a cost of power usage, to determine a net utility for a given allocation of workload over a set of server nodes.

9. The system of claim 8, wherein the performance function and power usage function are functions of CPU allocation.

10. The system of claim 8, wherein the utility function has user-definable control parameters to selective adjust an amount of tradeoff of performance against power usage.

11. The system of claim 1, wherein the performance manager transfers control of at least one server to the power manager via a notification message if it is determined that workloads should be consolidated on a smaller subset of running servers, and transferring control of the at least one server to the power manager results in placing the at least one server in a pool of unused servers to minimize power consumption.

12. The system of claim 1, wherein the performance manager issues a request message to the power manager to release at least one server if it is determined that additional servers are needed to meet performance objectives, and the power manager recommends one or more additional servers to be given control to the performance manager if the request message is approved by the power manager.

13. A method for managing computing resources in a distributed system including a plurality of server nodes forming a server cluster that provides a shared pool of server resources for executing data processing tasks, said method comprising:
    allocating server resources for placing applications over a set of server nodes in the server cluster to perform data processing tasks;
    determining if a more optimal application placement can be made to achieve a more optimal balance between performance level and power usage and meet power and performance objectives for a current workload; and
    dynamically adjusting resource allocation to obtain a more optimal application placement, wherein dynamically adjusting resource allocation includes sending a request message to transfer control of at least one server node between a performance manager system and a power manager system to redistribute the workload placement among the server nodes to achieve the more optimal application placement.

14. The method of claim 13, wherein the step of determining comprises evaluating a utility function, which includes a performance function to compute a performance level and power usage function to compute a cost of power usage, to determine a net utility for a given allocation of workload over a set of server nodes.

15. The method of claim 14, wherein the utility function has user-definable control parameters to selective adjust an amount of tradeoff of performance against power usage.

16. The method of claim 14, wherein the determining step is performed by collaboration between the power manager system and performance manager system to coordinate control of resource allocations to achieve performance level and power usage.

17. A program storage device readable by machine, tangibly embodying a program of instructions executable by the machine to perform method steps for managing computing resources in a distributed system including a plurality of server nodes forming a server cluster that provides a shared pool of server resources for executing data processing tasks, said method steps comprising:

allocating server resources for placing applications over a set of server nodes in the server cluster to perform data processing tasks;

determining if a more optimal application placement can be made to achieve a more optimal balance between performance level and power usage and meet power and performance objectives for a current workload; and dynamically adjusting resource allocation to obtain a more optimal application placement, wherein dynamically adjusting resource allocation includes sending a message to transfer control of at least one server node between a performance manager system and a power manager system to redistribute the workload placement among the server nodes to achieve the more optimal application placement.

18. The program storage device of claim 17, wherein the instructions for determining comprise instructions for evaluating a utility function, which includes a performance function to compute a performance level and power usage function to compute a cost of power usage, to determine a net utility for a given allocation of workload over a set of server nodes.

19. The program storage device of claim 18, wherein the utility function has user-definable control parameters to selective adjust an amount of tradeoff of performance against power usage.

20. The program storage device of claim 17, wherein the instructions for determining comprise instructions for enabling collaboration between the power manager system and performance manager system to coordinate control of resource allocations to achieve performance level and power usage.

* * * * *